(12) United States Patent
Pan et al.

(10) Patent No.: US 9,820,540 B2
(45) Date of Patent: Nov. 21, 2017

(54) SOLAR UMBRELLA

(71) Applicant: Yotrio Group Co., Ltd., Linhai (CN)

(72) Inventors: Jiangbo Pan, Linhai (CN); Weijie Wei, Linhai (CN)

(73) Assignee: Yotrio Group Co., Ltd., Linhai, Zhejiang (CN)

( * ) Notice: Subject to any disclaimer, the term of this patent is extended or adjusted under 35 U.S.C. 154(b) by 0 days.

(21) Appl. No.: 14/948,246

(22) Filed: Nov. 20, 2015

(65) Prior Publication Data
US 2017/0055653 A1    Mar. 2, 2017

(30) Foreign Application Priority Data
Aug. 28, 2015   (CN) ............ 2015 2 0661987 U (51) Int. Cl.
*A45B 25/00*   (2006.01)
*A45B 25/14*   (2006.01)

(52) U.S. Cl.
CPC .......... *A45B 25/00* (2013.01); *A45B 25/14* (2013.01); *A45B 25/143* (2013.01); *A45B 2025/003* (2013.01); *A45B 2200/1018* (2013.01); *A45B 2200/1027* (2013.01); *A45B 2200/1036* (2013.01); *A45B 2200/1045* (2013.01); *A45B 2200/1063* (2013.01)

(58) Field of Classification Search
CPC ................ A45B 2200/1027; A45B 2200/2018
USPC ............. 135/28, 33.6, 16; 320/101; 136/243
See application file for complete search history.

(56) References Cited

U.S. PATENT DOCUMENTS

| | | | | |
|---|---|---|---|---|
| 2,960,094 | A * | 11/1960 | Small ............... | A45B 25/14 126/569 |
| 5,273,062 | A * | 12/1993 | Mozdzanowski ..... | A45B 3/00 135/16 |
| 5,398,710 | A * | 3/1995 | Steiner ............ | A45B 19/06 135/16 |
| 6,058,951 | A * | 5/2000 | Wilson ............ | A45B 25/14 116/173 |
| 6,598,990 | B2 * | 7/2003 | Li ............... | A45B 3/04 362/102 |
| 8,104,491 | B2 * | 1/2012 | Li ............... | A45B 23/00 135/16 |
| 8,497,656 | B2 * | 7/2013 | Portis, Jr. ......... | A45B 3/00 136/243 |
| 8,695,614 | B2 * | 4/2014 | Chaimovski ....... | A45B 23/00 135/16 |

(Continued)

FOREIGN PATENT DOCUMENTS

FR   2942351 B1 *   6/2011   ............ H02S 30/20

*Primary Examiner* — Noah Chandler Hawk
(74) *Attorney, Agent, or Firm* — Jingming (James) Cai; SAC Attorneys LLP (57) ABSTRACT

Embodiments of the present invention provide an umbrella, comprising: an umbrella frame, an umbrella cloth, solar chips, a storage battery, and an electrical driving mechanism. The umbrella cloth covers the umbrella frame, the solar chips are disposed on an upper surface of the umbrella cloth, the solar chips are electrically connected with the storage battery, and the storage battery provides electrical energy to the electrical driving mechanism disposed on the umbrella frame so that the umbrella frame, driven by the electrical driving mechanism, achieves opening and closing motion. The present invention solves problems with the umbrellas in the prior art such as single functionality and difficult opening and closing.

3 Claims, 5 Drawing Sheets

(56) References Cited

U.S. PATENT DOCUMENTS

| | | | | |
|---|---|---|---|---|
| 8,757,183 B2* | 6/2014 | Volin | ............... | A45B 25/143 135/20.3 |
| 2004/0040591 A1* | 3/2004 | Ma | ............... | A45B 25/143 135/98 |
| 2004/0228118 A1* | 11/2004 | Peterson | ............... | A45B 3/04 362/102 |
| 2005/0161067 A1* | 7/2005 | Hollins | ............... | A45B 23/00 135/16 |
| 2006/0254636 A1* | 11/2006 | Tung | ............... | A45B 3/00 135/96 |
| 2007/0283987 A1* | 12/2007 | Reyes | ............... | A45B 3/04 135/16 |
| 2008/0092936 A1* | 4/2008 | Carabillo | ............... | A45B 3/04 135/16 |
| 2009/0058354 A1* | 3/2009 | Harrison | ............... | A45B 3/00 320/101 |
| 2010/0154786 A1* | 6/2010 | Li | ............... | A45B 23/00 126/624 |
| 2010/0180922 A1* | 7/2010 | McKenna | ............... | A45B 25/18 135/96 |
| 2012/0235477 A1* | 9/2012 | Korman | ............... | H01L 31/042 307/11 |
| 2014/0028242 A1* | 1/2014 | Akin | ............... | H02J 7/35 320/101 |

* cited by examiner

SOLAR UMBRELLA

CROSS-REFERENCE TO RELATED APPLICATION

The present application claims priority under 35 U.S.C. §119 to Chinese Patent Application No. 201520661987.1 filed on Aug. 28, 2015 before the State Intellectual Property Office of China, which are incorporated by reference herein in their entirety.

FIELD OF THE INVENTION

The present invention relates to a mechanical field, and particularly to an umbrella.

BACKGROUND OF THE INVENTION

An umbrella is extensively applied to sites such as beach, a villa, a swimming pool or a café. However, functionality of current umbrellas used outdoor for leisure purpose is generally relatively single. The umbrellas mainly function for umbrella purpose and do not have special functions. Furthermore, since an area of an umbrella surface of current umbrellas is large and an external upright column for supporting the umbrella surface is high, it is very laborious to directly open and close the umbrella manually. Although the Chinese patent with an announcement and grant number CN2482841Y discloses an umbrella that is opened electrically via a mechanical structure, such umbrella must be opened with a power source being externally connected and therefore is inconvenient in use. Meanwhile, as people depend more and more on digital technology, more people and events develop based on Internet and electronic science and technology, electrical energy and electronics are already closely related to people's life, and umbrellas having single functionality cannot suffice to meet needs of people's leisure life.

SUMMARY OF THE INVENTION

The present invention solves problems with the umbrellas in the prior art such as single functionality and difficult opening and closing.

To achieve the above object, the present invention relates to a umbrella, comprising a umbrella frame, an umbrella cloth, solar chips, a storage battery, and an electrical driving mechanism;

Wherein the umbrella cloth covers the umbrella frame, the solar chips are disposed on an upper surface of the umbrella cloth, the solar chips are electrically connected with the storage battery, and the storage battery provides electrical energy to the electrical driving mechanism disposed on the umbrella frame so that the umbrella frame, driven by the electrical driving mechanism, achieves opening and closing motion.

The umbrella according to embodiments of the present invention can convert light energy to electrical energy via the solar chips and uses the electrical energy to drive the electrical driving mechanism to complete the opening and closing motion of the umbrella frame, thereby achieving the opening and closing of the umbrella without a power source being externally connected. In addition, since the storage battery is used to collect the electrical energy converted from the solar energy, components having different electronic functions may be additionally provided according to consumer's different needs, for example, wired charging, atmospheric lighting, wireless Internet access and a spraying system, to substantially enrich the functions of the umbrella in use.

DETAILED DESCRIPTION OF THE INVENTION

Technical solutions of in embodiments of the present invention will be described clearly and completely with reference to the figures in embodiments of the present invention. Obviously, the embodiments described below are only partial embodiments of the present invention, not all embodiments. All other embodiments obtained by those having ordinary skill in the art without making inventive efforts based on the embodiments in the present invention all fall within the protection scope of the present invention.

Figure 1:
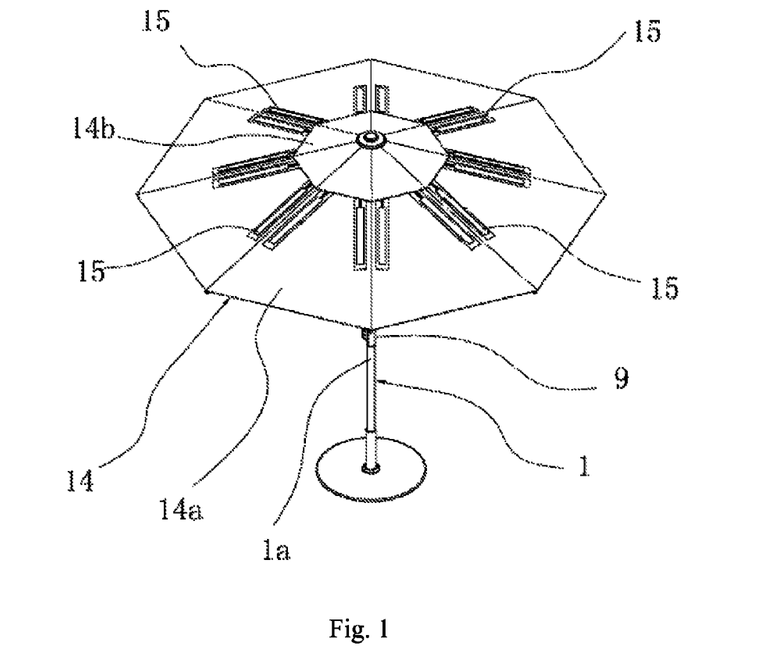
FIG. 1 is a structural schematic view of an umbrella according to an embodiment of the present invention.

FIG. 1 is a structural schematic view of an umbrella according to an embodiment of the present invention. As shown in FIG. 1, the umbrella comprises: an umbrella frame 1, umbrella cloth 14, solar chips 15, a storage battery 8 and an electrical driving mechanism; wherein the umbrella cloth 14 covers the umbrella frame, the solar chips 15 are disposed on an upper surface of the umbrella cloth 14, the solar chips 15 are electrically connected with the storage battery 8, and the storage battery 8 provides electrical energy to the electrical driving mechanism disposed on the umbrella frame 1 so that the umbrella frame 1, driven by the electrical driving mechanism, achieves opening and closing motion.

In an embodiment of the present invention, the umbrella cloth 14 may comprise an inner umbrella cloth 14a and a roof cloth 14b, wherein the roof cloth 14b is disposed on top of the umbrella and covers an upper portion of the inner umbrella cloth 14a, and through holes are provided between the roof cloth 14b and the inner umbrella cloth 14a for purpose of light and air permeability purpose.

Figure 9:
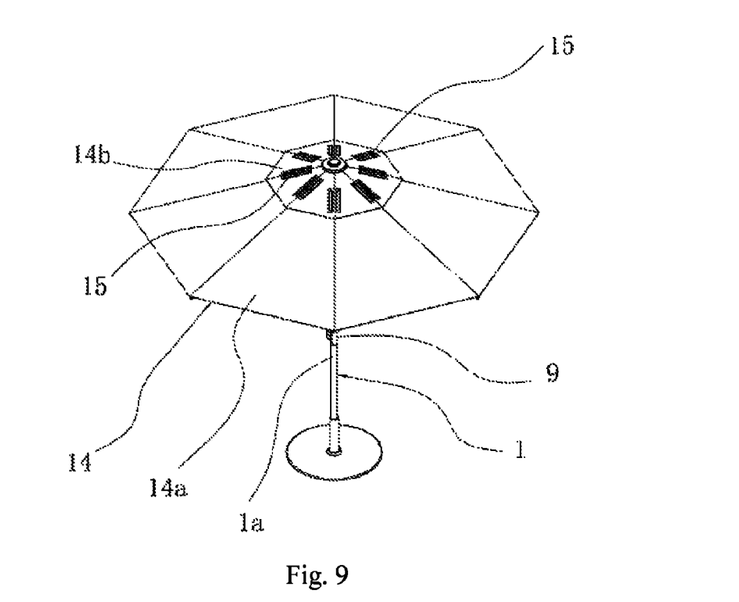
FIG. 9 is a structural schematic view of an umbrella according to another embodiment of the present invention.
Figure 10:
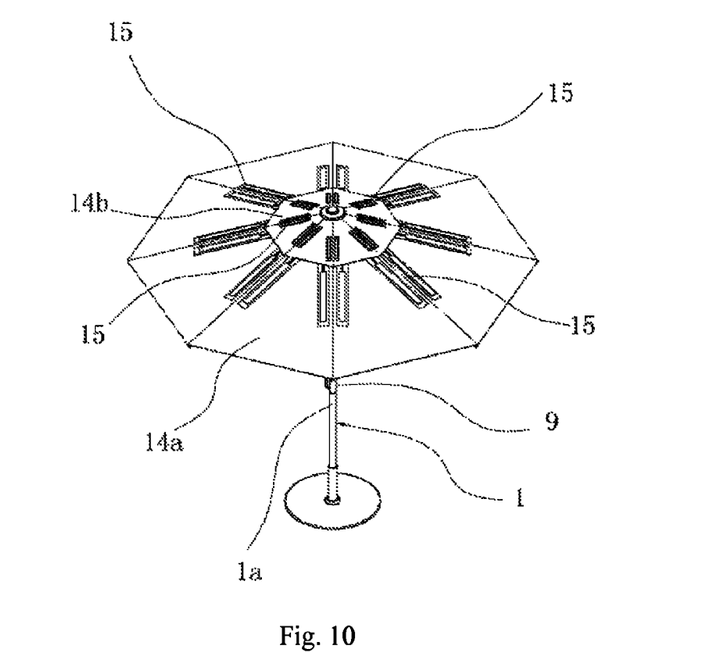
FIG. 10 is a structural schematic view of an umbrella according to a further embodiment of the present invention.

At this time, the solar chips 15 may be only disposed on an upper surface of the roof cloth 14b, as shown in FIG. 9, and may also be disposed on both the upper surface of the inner umbrella cloth 14a and the upper surface of the roof cloth 14b, as shown in FIG. 10. The present invention does not limit the positions of the solar chips 15.

In an embodiment of the present invention, the solar chips 15 may be made of monocrystalline silicon or polycrystalline silicon, whereupon an encapsulating bag for encapsulating monocrystalline silicon or polycrystalline silicon may be fabricated on the surface of the umbrella cloth 14 and may be opened and closed via a slide fastener. However, appearance of the surface of such umbrella cloth 14 is not flat and smooth enough and the solar chips 15 made of monocrystalline silicon or polycrystalline silicon have a larger thickness, cause a certain load to the umbrella cloth and affect convenience in use of the umbrella. Therefore, to further improve the smoothness of the surface of the umbrella cloth 14 and convenience in use of the umbrella, in another embodiment of the present invention, the solar chips 15 may employ photovoltaic thin films. The photovoltaic thin films may be directly printed and encapsulated on the surface of the umbrella cloth 14, and they have a smaller thickness and therefore cause a smaller load to the umbrella cloth of the umbrella. Besides, the surface of the umbrella cloth 14 appears smoother. In addition, the number of the solar chips 15 may depend on energy consumption needs of specific functions in use. The present invention does not limit the types and number of the solar chips 15.

The solar chips 15 convert light energy to electrical energy and use the electrical energy to drive the electrical driving mechanism to complete the opening and closing motion of the umbrella frame 1 so as to implement opening and closing of the umbrella without a power source being externally connected. Additionally, since the storage battery 8 is provided to collect electrical energy converted from solar energy, devices having different electronic functions may be additionally provided according to consumers' different demands so as to substantially enrich the functions of the umbrella in use. The specific functions that may be additionally provided will be discussed respectively in detail in subsequent embodiments.

In an embodiment of the present invention, as shown in FIG. 1, to perform uniform control of the functions in use, the umbrella may comprise a control device 9 disposed on the umbrella frame 1.

Figure 2:
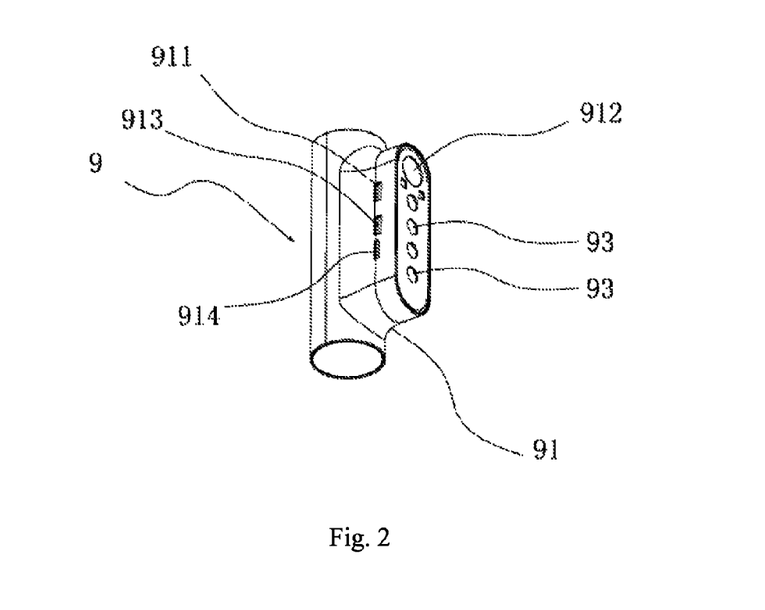
FIG. 2 is a structural schematic view of a control device of an umbrella according to an embodiment of the present invention.
Figure 3:
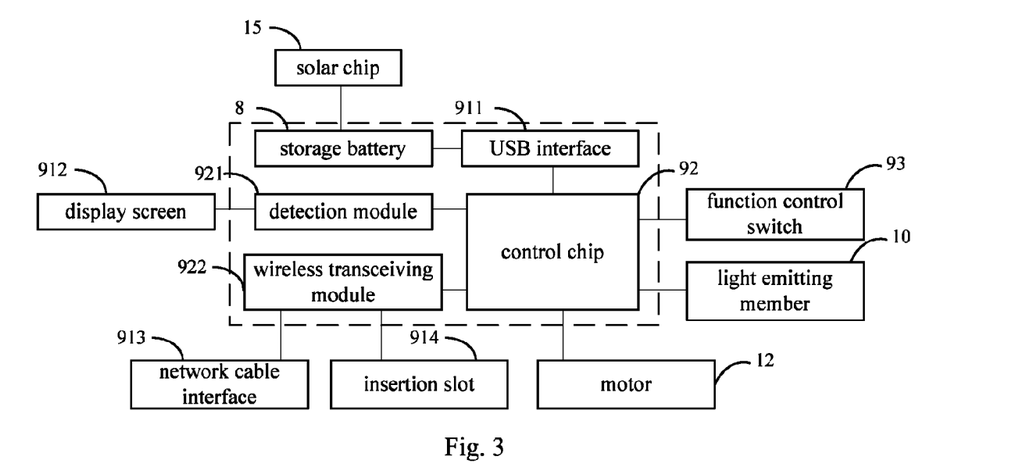
FIG. 3 is a circuit block diagram of an umbrella according to an embodiment of the present invention.

FIG. 2 is a structural schematic view of a control device of an umbrella according to an embodiment of the present invention. FIG. 3 is a circuit block diagram of an umbrella according to an embodiment of the present invention. As shown in FIG. 2 and FIG. 3, the control device 9 may comprise a control chip 92 and at least one function control switch 93, the control chip 92 is electrically connected with the storage battery 8, at least one function control switch 93 is electrically connected with the control chip 92 to control the electrical driving mechanism to achieve opening and closing of the electrical umbrella as well as switching operation of other additional functions on the umbrella. Hence, when the control chip 92 may perform multiple functions of use, each function control switch 93 corresponds to the opening and closing of one of functions of use.

In an embodiment of the present invention, the control device 9 of the umbrella may further comprise one or more of the following devices:

A USB interface 911 which is electrically connected with the storage battery 8 and the control chip 92 respectively. The USB interface 911 is used to provide a stable wired charging current for electronic products, increases functionality of the umbrella when being used outdoor, and further meets needs of people's leisure lift.

Figure 5:
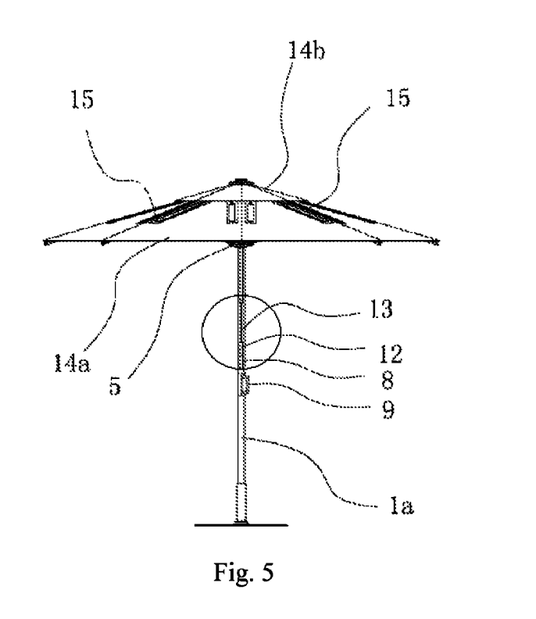
FIG. 5 is a structural schematic view of an umbrella according to an embodiment of the present invention.

A wireless transceiving module 922 which enables wireless routing, and/or a network cable interface and/or phone card insertion slot; wherein the wireless transceiving module 922 is connected with the control chip 92. For example, as shown in FIG. 5, a network cable interface 913 or an insertion slot 914 for inserting a phone card may be integrated on a housing 91 of the control device 9, the network cable interface 913 or the insertion slot 914 for inserting a phone card are respectively electrically connected with the wireless transceiving module 922 so that the umbrella can provide wireless Internet access function; one or both of the network cable interface 913 and the insertion slot 914 may be arranged. A control procedure of the wireless transceiving module 922 may be as follows: the wireless transceiving module 922 receives an electrical signal directed from the network cable interface 913 or phone card insertion slot 914, and transmits it in a wireless mode after being processed by the control chip 92.

A detection module 921 and a display screen 912; wherein the detection module 921 is connected with the storage battery 8 and the control chip 92 respectively to detect power storage situations of the storage battery 8; the display screen 912 is electrically connected with the detection module 921 to display electrical power quantity in the storage battery 8. A specific procedure for controlling the detection module 921 may be as follows: the detection module 921 detects the electrical power quantity in the storage battery 8 and compares it with a preset value of the control chip 92 so as to display the electrical power quantity of the storage battery 8 on the display screen 912 in the form of percentage. When the storage battery 8 is in a not full state, the control chip 92 enables the storage battery 8 to communicate with the solar chips 15 so that power generation function of the solar chips 15 charges the storage battery 8; when the storage battery 8 is detected in a full state, the control chip 92 automatically turns off the charging circuit.

Electronic components in the embodiment of the present invention all are fitted in a modularized manner. In respect of production design, other electronic functions may also be increased to meet consumers' different needs, e.g., electronic function components such as Bluetooth and sound equipment may be added to further enrich functionality of umbrella products. In addition, such modularized design may further improve flexibility of production of the products, for example, the USB interface 911 needn't be installed in a specific model of umbrella product, and the USB interface 911 needn't be selected and installed upon production of this umbrella. The present invention does not limit the types and number of electronic function modules included in the control device 9 of a specifically produced umbrella.

Figure 4:
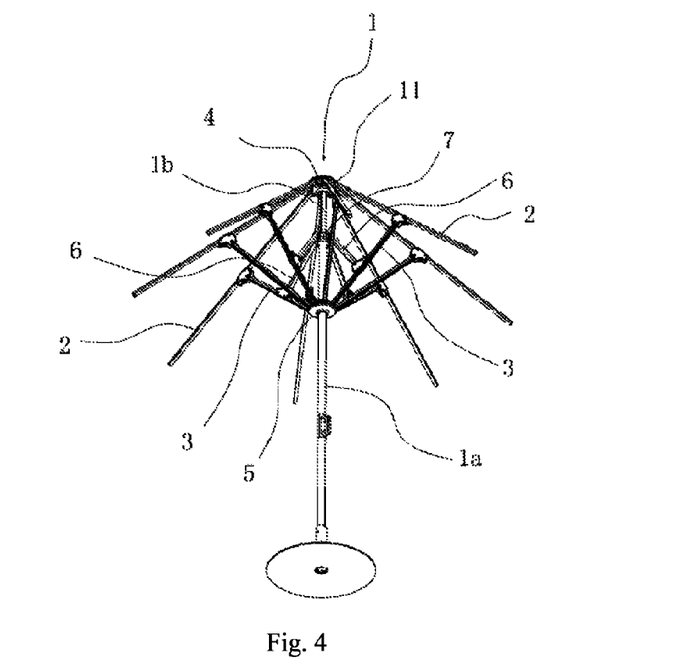
FIG. 4 is a structural schematic view of an umbrella frame of an umbrella according to an embodiment of the present invention.

FIG. 4 is a structural schematic view of an umbrella frame of an umbrella according to an embodiment of the present invention. As shown in FIG. 4, the umbrella frame 1 comprises an external upright column 1a, an internal upright column 1b, an upper umbrella disc 4, a middle umbrella disc 7, a lower umbrella disc 5, an upper umbrella rib 2, a middle umbrella rib 6 and a lower umbrella rib 3.

The upper umbrella disc 4 is disposed at a top end of the internal upright column 1b, the middle umbrella disc 7 is disposed at a top end of the external upright column 1a, the external upright column 1a is a hollow tubular structure, the internal upright column 1b passes through the middle umbrella disc 7 and is slideably connected in an inner cavity of the external upright column 1a, a bottom end of the internal upright column 1b is connected with the electrical driving mechanism built in the cavity of the external upright column 1a, and the lower umbrella disc 5 is slideably connected on the external upright column 1a.

A top end of the upper umbrella rib 2 is hinged to the upper umbrella disc 4, a bottom end of the upper umbrella rib 2 is suspended, a top end of the lower umbrella rib 3 is hinged to a middle portion of the upper umbrella rib 2, a bottom end of the lower umbrella rib 3 is hinged to the lower umbrella disc 5, a top end of the middle umbrella rib 6 is hinged to the middle umbrella disc 7, a bottom end of the middle umbrella rib 6 is hinged to a middle portion of the lower umbrella rib 3, and the umbrella cloth 14 covers the upper umbrella rib 2.

Rise of the upper umbrella disc 4 may bring the lower umbrella disc 5 to rise. Meanwhile, since the middle umbrella disc 7 remains stationary, when the lower umbrella disc 5 rises, the bottom end of the middle umbrella rib 6 rises and the top end of the lower umbrella rib 3 expands outward to thereby further bring the upper umbrella rib 2 to expand and achieve electrical opening of the umbrella. Likewise, the closing of the umbrella may be implemented by executing a procedure reverse to the above procedure. In addition, the electrical driving mechanism is built in the external upright column 1a, thereby providing pleasant appearance and stable performance and meanwhile avoiding damages to the electrical driving mechanism due to wind and rain erosion.

In an embodiment, the solar chips 15 are disposed or directly printed and encapsulated adjacently on either side of each of the upper umbrella rib 2. More specifically, a first pair of the solar chips 15 are printed on the top surface of the umbrella cloth 14 on either side of the upper umbrella rib 2 and are extending parallelly along the upper umbrella rib 2 (see, FIG. 1). The first pair of solar chips 15 on either side of the upper umbrella rib 2 are placed at a substantial distance from another pair of solar chips, for example a second pair of solar chips, present on an adjacent upper umbrella rib 2. Such placement of the solar chips 15 facilitates easy and smooth operation of the umbrella (i.e., opening and closing operation of the umbrella). More generally, such placement of the solar chips 15 precludes any bending/folding of the solar chips 15 during the opening and closing motion of the umbrella. Also, the solar chips 15 as mentioned earlier may be made of photovoltaic thin films, which are directly printed and encapsulated adjacent to the upper umbrella rib 2 on either of its sides, thereby providing a smaller load to the umbrella cloth 14 of the umbrella and facilitating convenience in use of the umbrella.

Figure 6:
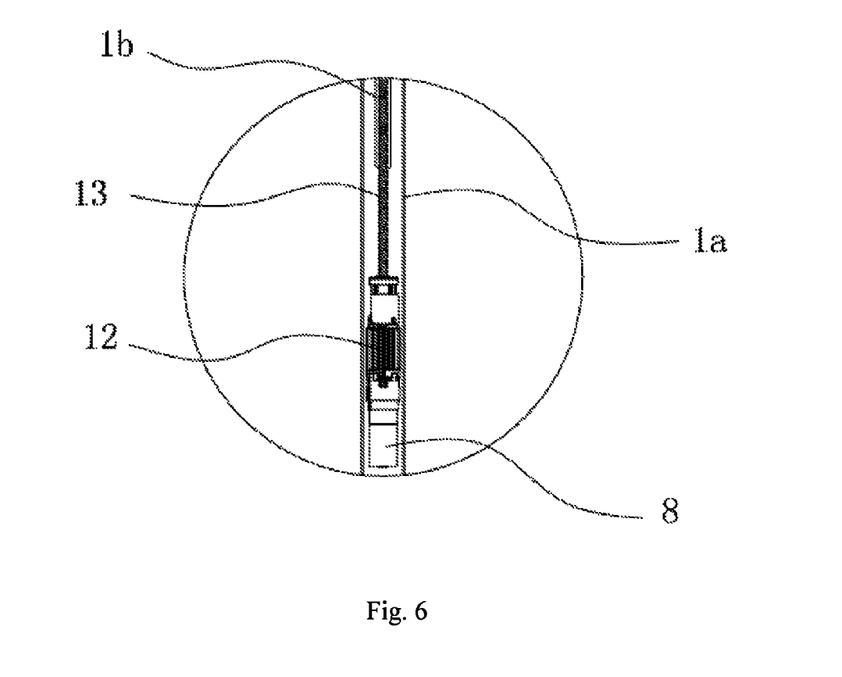
FIG. 6 is a partially enlarged schematic view of an electrical driving mechanism of the umbrella shown in FIG. 5.

FIG. 5 is a structural schematic view of an umbrella according to an embodiment of the present invention. FIG. 6 is a partially enlarged schematic view of an electrical driving mechanism of the umbrella shown in FIG. 5. As shown in FIG. 5 and FIG. 6, the storage battery 8 is built in the external upright column 1a, the electrical driving mechanism comprises a motor 12 and a screw 13, the motor 12 is electrically connected with the storage battery 8, the screw 13 is connected with a motor shaft of the motor 12, and a bottom end of the internal upright column 1b is connected with the screw 13. As such, rotation of the motor shaft of the motor 12 may bring the screw to rotate so that the internal upright column 1b makes an ascending motion relative to the screw 13.

In another embodiment of the present invention, the electrical driving mechanism comprises a motor 12, a traction wheel and a traction cord, the motor 12 is electrically connected with the storage battery 8, the traction wheel is mounted on the motor shaft of the motor 12, one end of the traction cord is fixed on the traction wheel, and a bottom end of the internal upright column 1b is connected to the other end of the traction cord. As such, the traction cord is driven by the motor 12 to achieve rise and fall of the internal upright column 1b to control the opening and closing of the umbrella.

Figure 7:
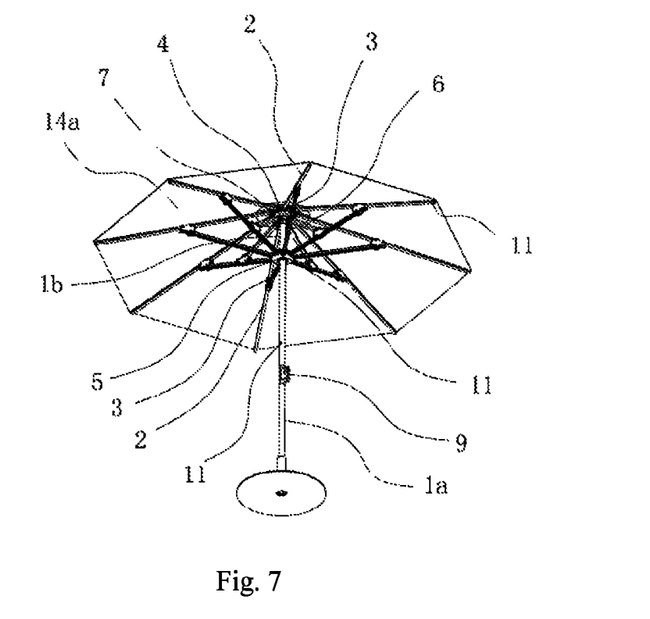
FIG. 7 is a structural schematic view of an umbrella according to an embodiment of the present invention.

In an embodiment of the present invention, as shown in FIG. 7, the umbrella may further comprise a plurality of spray nozzles 11. The plurality of spray nozzles 11 are distributed on the external upright column 1a, the upper umbrella disc 4, the middle umbrella disc 7, the lower umbrella disc 5 and the upper umbrella rib 2, and each spray nozzle 11 is electrically connected with the control chip 92. At this time, on the control device 9 is provided at least one function control switch 93 for controlling on and off of these spray nozzles 11. These spray nozzles 11 can convert water into mist to create a touch of coolness in a high-temperature environment and function to lower temperature. Water for spraying may be provided by a peripheral device, or a water pipe is provided in the external upright column 1a or upper umbrella disc 4 to feed water.

In an embodiment of the present invention, the umbrella may further comprise a plurality of light emitting members 10, the plurality of light emitting members 10 are arranged on the upper umbrella rib 2, the middle umbrella rib 6 and the lower umbrella rib 3, and each light emitting member 10 is electrically connected with the storage battery 8. The light emitting members 10 may create atmospheric lighting and provide illumination for consumers at night.

Figure 8:
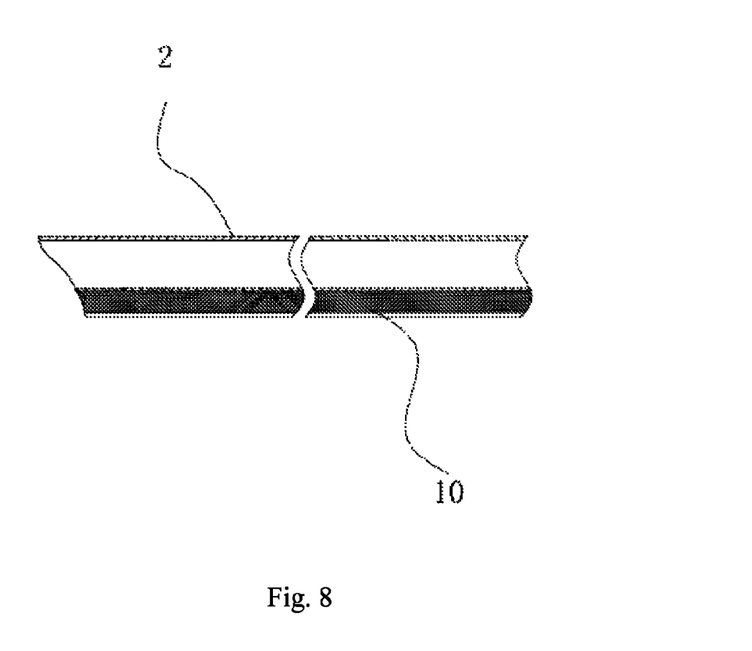
FIG. 8 is a view showing installation of a light emitting member of the umbrella according to an embodiment of the present invention.

In an embodiment of the present invention, as shown in FIG. 8, the upper umbrella rib 2, the middle umbrella rib 6 and the lower umbrella rib 3 all are hollow tubular structures, the light emitting member is built in a pipe cavity of the umbrella rib, the light emitting member 10 may be a LED strip built in the pipe cavity of the upper umbrella rib 2 or middle umbrella rib 6 or lower umbrella rib 3. The LED strip is made of a hard material and can be inserted in the umbrella rib quickly and conveniently. The light-emitting member 10 may further be a LED belt arranged axially along the upper umbrella rib 2 or middle umbrella rib 6 or lower umbrella rib 3 and close to an wall surface of the upper umbrella rib 2 or middle umbrella rib 6 or lower umbrella rib 3, or a bulb hung on the upper umbrella rib or middle umbrella rib or lower umbrella rib. The present invention does not limit the types of the light emitting members 10.

What are described above are only preferred embodiments of the present invention, and are not intended to limit the present invention. Any modifications and equivalent substitutions made within the spirit and principle of the present invention shall all be included in the protection scope of the present invention.

The invention claimed is:
1. An umbrella, comprising:
an umbrella frame comprising an internal upright column, and an external upright column disposed at a bottom end of the internal upright column;
an upper umbrella disc disposed at a top end of the internal upright column and a plurality of upper umbrella ribs hinged to the upper umbrella disc at one end and suspended from other end;
an umbrella cloth covering the umbrella frame, wherein the umbrella cloth comprises an inner umbrella cloth and a roof cloth, wherein the roof cloth is disposed on top of the umbrella, wherein an upper portion of the inner umbrella cloth and the roof cloth fully overlap each other when the umbrella is fully open;
a plurality of solar chips electrically connected to a storage battery, wherein the solar chips are disposed both on an upper surface of the inner umbrella cloth and on an upper surface of the roof cloth;

an electrical driving mechanism, wherein the storage battery is charged by the solar chips, and wherein the storage battery provides electrical energy to the electrical driving mechanism disposed on the umbrella frame so that the umbrella frame, driven by the electrical driving mechanism, achieves opening and closing of the umbrella;

said umbrella frame further comprising a middle umbrella disc, a lower umbrella disc, a middle umbrella rib and a lower umbrella rib, wherein the middle umbrella disc is disposed at a top end of the external upright column, wherein the external upright column is a hollow tubular structure, wherein the internal upright column passes through the middle umbrella disc and is slideably connected in an inner cavity of the external upright column, wherein said bottom end of the internal upright column is connected to the electrical driving mechanism built in a pipe cavity of the external upright column, wherein the lower umbrella disc is slideably connected on the external upright column, wherein a top end of the lower umbrella rib is hinged to a middle portion of the upper umbrella rib, wherein a bottom end of the lower umbrella rib is hinged to the lower umbrella disc, wherein a top end of the middle umbrella rib is hinged to the middle umbrella disc, wherein a bottom end of the middle umbrella rib is hinged to a middle portion of the lower umbrella rib, and wherein the umbrella cloth covers the upper umbrella rib; and a plurality of water spray nozzles, wherein the plurality of water spray nozzles are distributed on one or more of the external upright column, the upper umbrella disc, the middle umbrella disc, the lower umbrella disc and the upper umbrella rib, wherein a water supply peripheral device is located in the upper umbrella disc, wherein the water supply peripheral device supplies water to the plurality of water spray nozzles, wherein each of the plurality of water spray nozzles is electrically connected to a control chip disposed within a control device disposed on the umbrella frame, wherein the control device further comprises at least one function control switch, wherein the control chip is electrically connected to the storage battery, wherein the at least one function control switch is electrically connected to the control chip, wherein one of the at least one function control switch is used to control on and off of the water spray nozzles, and wherein an opening and closing of the plurality of water spray nozzles converts the water into mist.

2. An umbrella, comprising:

an umbrella frame comprising an internal upright column, and an external upright column disposed at a bottom end of the internal upright column;

an upper umbrella disc disposed at a top end of the internal upright column and a plurality of upper umbrella ribs hinged to the upper umbrella disc at one end and suspended from other end;

an umbrella cloth covering the umbrella frame, wherein the umbrella cloth comprises an inner umbrella cloth and a roof cloth, wherein the roof cloth is disposed on top of the umbrella, wherein an upper portion of the inner umbrella cloth and the roof cloth fully overlap each other when the umbrella is fully open;

a plurality of solar chips electrically connected to a storage battery, wherein the solar chips are disposed both on an upper surface of the inner umbrella cloth and on an upper surface of the roof cloth;

an electrical driving mechanism, wherein the storage battery is charged by the solar chips, and wherein the storage battery provides electrical energy to the electrical driving mechanism disposed on the umbrella frame so that the umbrella frame, driven by the electrical driving mechanism, achieves opening and closing of the umbrella; and said umbrella frame further comprising a middle umbrella disc, a lower umbrella disc, a middle umbrella rib and a lower umbrella rib, wherein a plurality of water spray nozzles are distributed on one or more of the external upright column, the upper umbrella disc, the middle umbrella disc, the lower umbrella disc and the upper umbrella rib, wherein a water supply peripheral device is located in the upper umbrella disc, wherein the water supply peripheral device supplies water to the plurality of water spray nozzles, wherein each of the plurality of water spray nozzles is electrically connected to a control chip disposed within a control device disposed on the umbrella frame, wherein the control device further comprises at least one function control switch, wherein the control chip is electrically connected to the storage battery, wherein the at least one function control switch is electrically connected to the control chip, wherein one of the at least one function control switch is used to control on and off of the water spray nozzles, and wherein an opening and closing of the plurality of water spray nozzles converts the water into mist.

3. An umbrella, comprising:

an umbrella frame comprising an internal upright column, and an external upright column disposed at a bottom end of the internal upright column;

an upper umbrella disc disposed at a top end of the internal upright column and a plurality of upper umbrella ribs hinged to the upper umbrella disc at one end and suspended from other end;

an umbrella cloth covering the umbrella frame, wherein the umbrella cloth comprises an inner umbrella cloth and a roof cloth, wherein the roof cloth is disposed on top of the umbrella, wherein an upper portion of the inner umbrella cloth and the roof cloth fully overlap each other when the umbrella is fully open;

a plurality of solar chips electrically connected to a storage battery, wherein the solar chips are disposed on an upper surface of the inner umbrella cloth and/or on an upper surface of the roof cloth;

an electrical driving mechanism, wherein the storage battery is charged by the solar chips, and wherein the storage battery provides electrical energy to the electrical driving mechanism disposed on the umbrella frame so that the umbrella frame, driven by the electrical driving mechanism, achieves opening and closing of the umbrella; and said umbrella frame further comprising a middle umbrella disc, a lower umbrella disc, a middle umbrella rib and a lower umbrella rib, wherein a plurality of water spray nozzles are distributed on one or more of the external upright column, the upper umbrella disc, the middle umbrella disc, the lower umbrella disc and the upper umbrella rib, wherein a water supply peripheral device is located in the upper umbrella disc, wherein the water supply peripheral device supplies water to the plurality of water spray nozzles, wherein each of the plurality of water spray nozzles is electrically connected to a control chip disposed within a control device disposed on the umbrella frame, wherein the control device further comprises at least one function control switch, wherein the control chip is electrically connected to the storage battery, wherein the at least one function control switch is electrically connected to the control chip, wherein one of the at least one function control switch is used to control on and off of the water spray nozzles, and wherein an opening and closing of the plurality of water spray nozzles converts the water into mist.

* * * * *